(12) United States Patent
Qian (10) Patent No.: US 12,299,281 B2
(45) Date of Patent: May 13, 2025

(54) MEMORY SYSTEMS AND OPERATION METHODS THEREOF, HOST DEVICES AND OPERATION METHODS THEREOF, AND COMPUTER-READABLE STORAGE MEDIA

(71) Applicant: Yangtze Memory Technologies Co., Ltd., Hubei (CN)

(72) Inventor: Dabing Qian, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/466,813

(22) Filed: Sep. 13, 2023

(65) Prior Publication Data

US 2024/0427491 A1    Dec. 26, 2024

Related U.S. Application Data

(63) Continuation of application No. PCT/CN2023/101835, filed on Jun. 21, 2023.

(51) Int. Cl.
*G06F 3/06* (2006.01)

(52) U.S. Cl.
CPC .......... *G06F 3/0608* (2013.01); *G06F 3/0659* (2013.01); *G06F 3/0679* (2013.01)

(58) Field of Classification Search
CPC ......... H01L 21/28035; H01L 21/28088; H01L 21/823437; H01L 21/823462;
(Continued)

(56) References Cited

U.S. PATENT DOCUMENTS

| | | | |
|---|---|---|---|
| 10,684,992 | B1 | 6/2020 | Marks |
| 2016/0253229 | A1 | 9/2016 | Sade et al. |

(Continued)

FOREIGN PATENT DOCUMENTS

| | | |
|---|---|---|
| CN | 109710451 A | 5/2019 |
| CN | 115729734 A | 3/2023 |

(Continued)

OTHER PUBLICATIONS

International Searching Authority, "International Search Report," issued in connection with International Patent Application No. PCT/CN2023/101835, mailed on Feb. 16, 2024, 10 pages. [English Machine Translation Included].

(Continued)

*Primary Examiner* — Yong J Choe
(74) *Attorney, Agent, or Firm* — HANLEY, FLIGHT & ZIMMERMAN, LLC (57) ABSTRACT

Examples of the present disclosure provide a memory system and operation method thereof, a host device and operation method thereof, and a computer-readable storage medium. The memory system includes a memory device and a memory controller coupled to the memory device; The memory controller is configured to: receive a read command, the read command indicating to read event log information generated during running of firmware, the event log information including an index number and a parameter value of an event log; and the firmware runs different functional modules to correspondingly generate different event log elements, the different event log elements corresponding to different index numbers.

20 Claims, 6 Drawing Sheets

(58) Field of Classification Search
CPC .......... H01L 21/823475; H01L 27/088; H01L 29/0665; H01L 29/0673; H01L 29/401; H01L 29/42392; H01L 29/66439; H01L 29/66545; H01L 29/66742; H01L 29/7848; H01L 29/78645; H01L 29/78696
See application file for complete search history.

(56) References Cited

U.S. PATENT DOCUMENTS

| | | | |
|---|---|---|---|
| 2019/0129774 A1* | 5/2019 | Konan | G06F 11/0778 |
| 2020/0159455 A1* | 5/2020 | Lee | G06F 3/0604 |
| 2021/0286553 A1 | 9/2021 | Moiseyenko | |

FOREIGN PATENT DOCUMENTS

| | | |
|---|---|---|
| CN | 115905119 A | 4/2023 |
| WO | 2020145973 A1 | 7/2020 |
| WO | 2022083287 A1 | 4/2022 |

OTHER PUBLICATIONS

International Searching Authority, "Written Opinion," issued in connection with International Patent Application No. PCT/CN2023/101835, mailed on Feb. 16, 2024, 8 pages. [English Machine Translation Included].

* cited by examiner

MEMORY SYSTEMS AND OPERATION METHODS THEREOF, HOST DEVICES AND OPERATION METHODS THEREOF, AND COMPUTER-READABLE STORAGE MEDIA

CROSS-REFERENCE TO RELATED APPLICATION

This application is a continuation of International Patent Application PCT/CN2023/101835, filed on Jun. 21, 2023, which is hereby incorporated by reference in its entirety.

TECHNICAL FIELD

The present disclosure relates to, but is not limited to, a memory system and operation method thereof, a host device and operation method thereof, and a computer-readable storage medium.

BACKGROUND

With the rapid development of data storage technologies, more and more data memory systems, such as Solid State Drives (SSDs) and the like, have appeared in electronic devices. SSDs have been widely used in military, automotive, industrial, medical and aviation fields because of its characteristics such as fast read and write speed, anti-vibration, low power consumption, no noise, low heat and light weight.

DETAILED DESCRIPTION

Example examples of the present disclosure will be described in more detail below with reference to the accompanying drawings. Although example examples of the present disclosure are shown in the drawings, it should be understood that the present disclosure may be embodied in various forms and should not be limited to the specific examples set forth herein. Rather, these examples are provided so that the present disclosure can be more thoroughly understood and the scope of the present disclosure can be fully conveyed to those skilled in the art.

In the following description, numerous specific details are given in order to provide a more thorough understanding of the present disclosure. It will be apparent, however, to one skilled in the art that the present disclosure may be practiced without one or more of these details. In other instances, some technical features known in the art are not described to avoid confusion with the present disclosure; that is, not all features of the actual example are described here, and well-known functions and structures are not described in detail.

In the drawings, the size of layers, regions, elements and their relative sizes may be exaggerated for clarity. Like reference numerals refer to like elements throughout.

It will be understood that when an element or layer is referred to as being "on," "adjacent to," "connected to" or "coupled to" another element or layer, it can be directly on, adjacent to, connected to, or coupled to other elements or layers, or intervening elements or layers may be present. In contrast, when an element is referred to as being "directly on," "directly adjacent to," "directly connected to" or "directly coupled to" another element or layer, there are no intervening elements or layers present. It will be understood that, although the terms such as first, second, third etc. may be used to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be represented as a second element, component, region, layer or section without departing from the teachings of the present disclosure. When a second element, component, region, layer or section is discussed, it does not indicate that the present disclosure necessarily presents a first element, component, region, layer or section.

Spatial relation terms such as "under", "below", "beneath", "underneath", "on", "above" and so on, can be used here for convenience to describe the relationship of one element or feature to other elements or features shown in the figures. It will be understood that the spatial relation terms are intended to encompass different orientations of the device in use and operation in addition to the orientation depicted in the figures. For example, if the device in the figures is turned over, elements or features described as "below" or "under" or "beneath" other elements or features would then be oriented "above" the other elements or features. Thus, the example terms "below" and "beneath" can encompass both orientations of above and below. The device may be otherwise oriented (rotated 90 degrees or at other orientations) and the spatial descriptors used herein may be interpreted accordingly.

The terminology used herein is merely for the purpose of describing particular examples and is not to be taken as a limitation of the present disclosure. As used herein, the singular forms "a", "an" and "said/the" are intended to include the plural forms as well, unless the context clearly dictates otherwise. It should also be understood that the terms "consists of" and/or "comprising", when used in this specification, identify the presence of stated features, integers, steps, operations, elements and/or parts, but do not exclude presence or addition of one or more other features, integers, steps, operations, elements, parts and/or groups. As used herein, the term "and/or" includes any and all combinations of the associated listed items.

To understand the characteristics and technical contents of the examples of the present disclosure in more detail, the implementations of the examples of the present disclosure will be described in detail below in conjunction with the accompanying drawings. The attached drawings are for reference and description only, and are not intended to limit the examples of the present disclosure.

Figure 1:
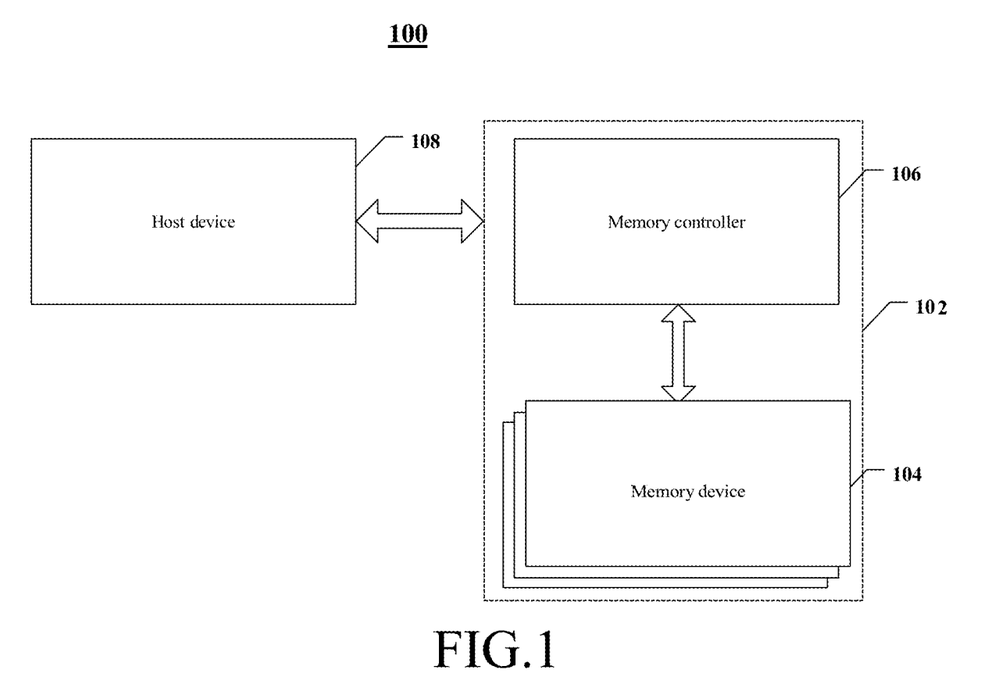
FIG. 1 is a schematic diagram of an example system with a memory system according to an example of the present disclosure.

FIG. 1 shows a block diagram of an example system 100 with memories in accordance with some aspects of the present disclosure. System 100 may be a mobile phone, desktop computer, laptop computer, tablet computer, vehicle computer, game console, printer, pointing device, wearable electronic device, smart sensor, virtual reality (VR) device, augmented reality device or any other suitable electronic device having storage therein. As shown in FIG. 1, system 100 may include a host device 108 and a memory system 102 having one or more memory devices 104 and a memory controller 106. The host device 108 may be a processor (e.g., a central processing unit) or a system on a chip (e.g., an application processor) of an electronic device. Host device 108 may be configured to send data to or receive data from memory device 104.

According to some implementations, memory controller 106 is coupled to memory device 104 and host device 108 and is configured to control memory device 104. Memory controller 106 may manage data stored in memory device 104 and communicate with host device 108. In some implementations, memory controller 106 is designed to operate in low duty-cycle environments such as Secure Digital cards, Compact Flash cards, Universal Serial Bus flash drives, or other media for use in electronic devices such as personal computers, digital cameras, mobile phones, and the like. In some implementations, the memory controller 106 is designed for operation in a high duty-cycle environment SSD or embedded multimedia card used as data storage for mobile devices such as a smartphone, tablet computer, laptop computer, etc., and enterprise memory arrays.

The memory controller 106 may be configured to control operations of the memory device 104, such as read, erase and program operations. The memory controller 106 may further be configured to manage various functions related to data stored or to be stored in the memory device 104, including but not limited to bad block management, garbage collection, logical-to-physical address translation, wear leveling, and the like. In some implementations, memory controller 106 is further configured to process error correction code on data read from or written to memory device 104. Memory controller 106 may further perform any other suitable functions, such as formatting memory device 104. Memory controller 106 may communicate with external devices (e.g., host device 108) according to a particular communication protocol. For example, the memory controller 106 can communicate with external devices through at least one of various interface protocols, such as USB protocol, MMC protocol, Peripheral Component Interconnect protocol, Peripheral Component Interconnect Express protocol, Advanced Technology Attachment protocol, Serial Advanced Technology Attachment protocol, Parallel Advanced Technology Attachment protocol, Small Computer Small Interface protocol, Enhanced Small Disk Interface protocol, Integrated Drive Electronics protocol, Firewire protocol, etc.

Figure 2A:
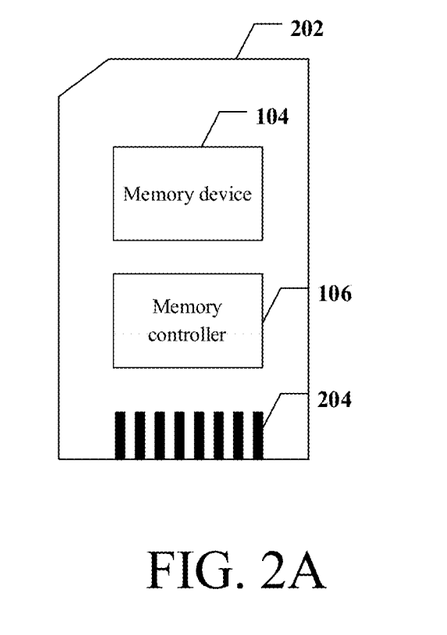
FIG. 2A is a schematic diagram of an example memory card with a memory system according to an example of the present disclosure.
Figure 2B:
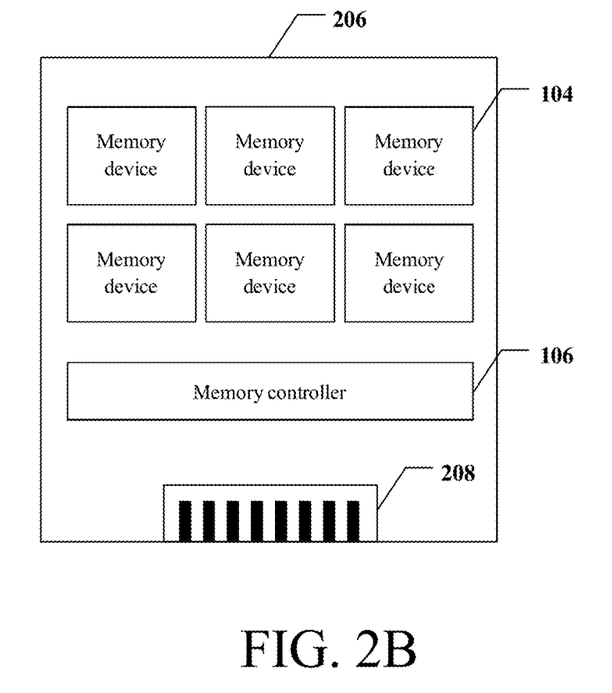
FIG. 2B is a schematic diagram of an example solid state drive with a memory system according to an example of the present disclosure.

The memory controller 106 and the one or more memory devices 104 may be integrated into various types of storage devices, e.g., be included in the same package (e.g., a Universal Flash Storage (UFS) package or an Embedded Multi-Media Card package). That is, the memory system 102 can be implemented and packaged into different types of end electronic products. In one example as shown in FIG. 2A, memory controller 106 and a single memory device 104 may be integrated into memory card 202. The memory card 202 may include a Compact Flash card, Smart Media card, memory stick, multimedia card, Secure Digital card, UFS, etc. The memory card 202 may further include a memory card connector 204 that couples the memory card 202 with a host device (e.g., host device 108 in FIG. 1). In another example as shown in FIG. 2B, memory controller 106 and multiple memory devices 104 may be integrated into SSD 206. SSD 206 may further include SSD connector 208 that couples SSD 206 to a host device (e.g., host device 108 in FIG. 1). In some implementations, the storage capacity and/or operating speed of SSD 206 is greater than the storage capacity and/or operating speed of memory card 202.

Figure 3A:
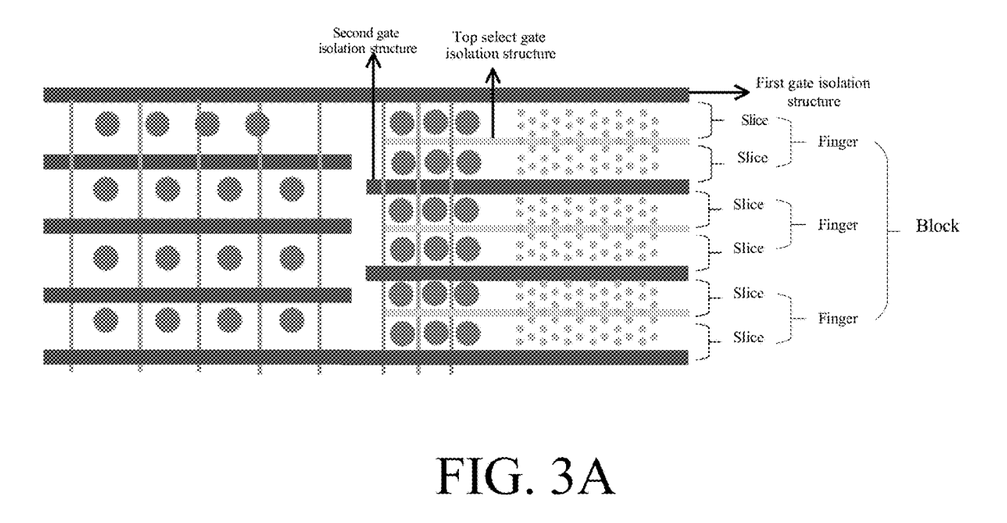
FIG. 3A is a schematic diagram of the distribution of memory cells of a three-dimensional NAND memory according to an example of the present disclosure.

FIG. 3A provides a structural schematic diagram of a memory array of a three-dimensional NAND memory according to some examples of this present disclosure. As shown in FIG. 3A, the memory array of a three-dimensional NAND memory consists of several memory cell rows parallel to gate line slit structure and staggered in parallel. Every four rows of memory cell are separated by a gate isolation structure and a top selection gate isolation structure, and each memory cell row includes a plurality of memory cells. The gate isolation structure may include a first gate line slit structure and a second gate line slit structure. The first gate line slit structure divides the memory array into a plurality of blocks, the plurality of second gate line slit structures divides the blocks into multiple fingers, and the top selection gate isolation structure set in the middle of each finger can divide the finger into two parts, so that the finger is divided into two slices. A block shown in FIG. 3A includes 6 slices, and in practical applications, the number of slices in a block is not limited to this. The memory cells in a slice coupled to a certain word line may be associated with a page, which is here a physical page.

It should be noted that the number of memory cell rows between the gate line slit structure and the top selection gate isolation structure shown in FIG. 3A is merely example, not to limit the number of memory cell rows that one finger of three-dimensional NAND memory contains in the disclosure. In practical applications, the number of memory cell rows included in a finger can be adjusted to such as 2, 4, 8, 16, and so on, according to actual situations.

Figure 3B:
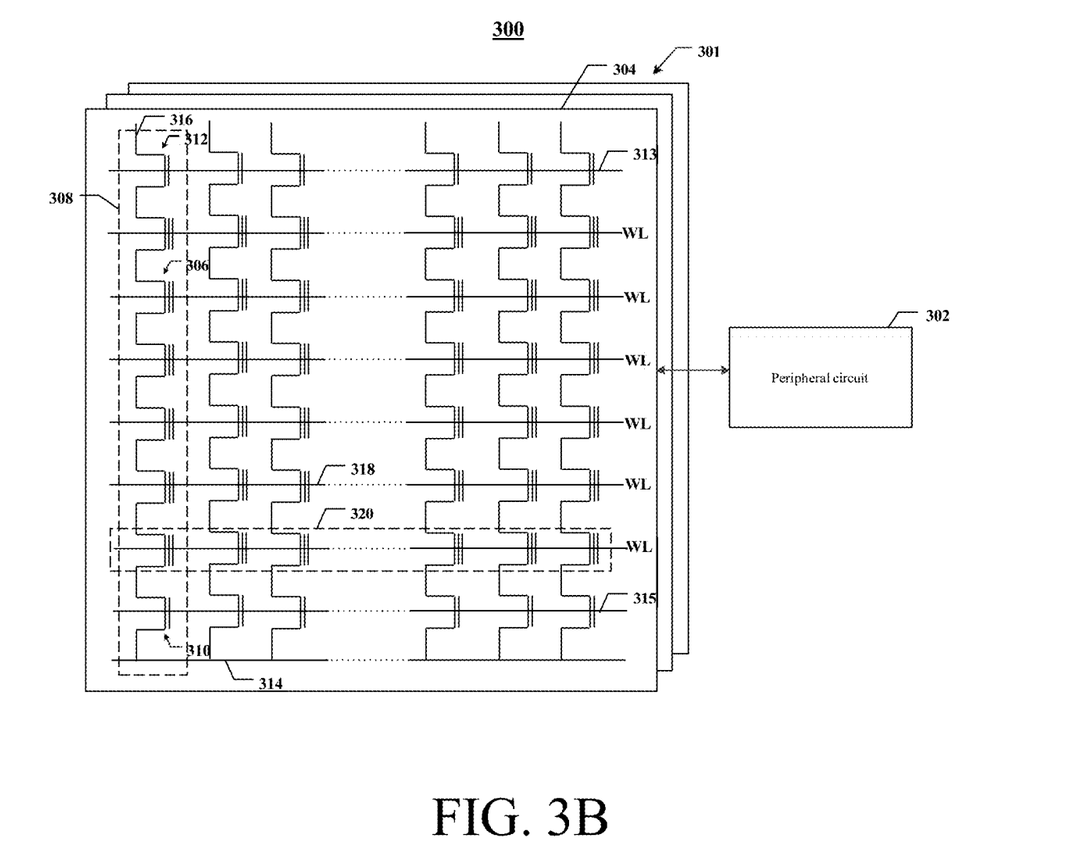
FIG. 3B is a schematic diagram of an example memory device including peripheral circuits according to an example of the present disclosure.

FIG. 3B shows a schematic circuit diagram of an example memory device 300 including peripheral circuit in accordance with some aspects of the present disclosure. Memory device 300 may be an example of memory device 104 in FIG. 1. Memory device 300 may include a memory array 301 and peripheral circuits 302 coupled to memory array 301. The memory array 301 is illustrated as an example of a three-dimensional NAND type memory array, where the memory cells 306 are NAND memory cells and are provided in the form of an array of memory strings 308, each memory string 308 extending vertically above a substrate (not shown). In some implementations, each memory string 308 includes a plurality of memory cells 306 coupled in series and stacked vertically. Each memory cell 306 may hold a continuous analog value, such as a voltage or charge, depending on the number of electrons trapped within the area of the memory cell 306. Each memory cell 306 may be a floating-gate memory cell including a floating gate transistor, or a charge-trap memory cell including a charge trap transistor.

In some implementations, each memory cell 306 is a single-level cell (SLC) that has two possible memory states and can thus store one bit of data. For example, a first memory state of "0" may correspond to a first voltage range, and a second memory state of "1" may correspond to a second voltage range. In some implementations, each memory cell 306 is a multi-level cell (MLC) capable of storing more than a single bit of data in more than four memory states. For example, MLCs can store two bits per cell, three bits per cell (also known as triple-level cells (TLC)), or four bits per cell (also known as quad-level cells (QLC)). Each MLC can be programmed to assume a range of possible nominal storage values. In one example, if each MLC stores two bits of data, the MLC can be programmed to take three possible programming levels from the erased state by writing one of three possible nominal storage values into the cell. A fourth nominal storage value may be used for the erased state.

As shown in FIG. 3B, each memory string 308 may include a Bottom Selected Transistor (BST) 310 at its source terminal and a Top Selected Transistor (TST) 312 at its drain terminal. Both BST 310 and TST 312 may be configured to activate selected memory strings 308 during read and program operations. In some implementations, the sources of the memory strings 308 in the same block 304 are coupled by the same source line (SL) 314 (e.g., a common SL). In other words, according to some examples, all memory strings 308 in the same block 304 have an Array Common Source (ACS). According to some implementations, the TST 312 of each memory string 308 is coupled to a corresponding bit line (BL) 316 from which data can be read or written via an output bus (not shown). In some implementations, each memory string 308 is configured to be selected or deselected by applying to corresponding TST 312 a select voltage (e.g., higher than a threshold voltage of a transistor with TST 312) or a deselection voltage (for example, 0V) via one or more Top Selected Line (TST) 313, and/or, by applying to corresponding BST 310 a select voltage (e.g., higher than a threshold voltage of a transistor with BST 310) or a deselection voltage (for example, 0V) via one or more Bottom Selected Line (BSL) line 315.

As shown in FIG. 3B, memory string 308 may be organized into a plurality of memory blocks 304, each of which may have a common source line 314 (e.g., coupled to ground). In some implementations, each block 304 is the basic unit of data for an erase operation, i.e., all memory cells 306 on the same block 304 are erased simultaneously. To erase the memory cells 306 in a selected block, an erase voltage (Vers) (e.g., a high positive voltage (e.g., 20V or higher)) is bias coupled to source lines 314 of the selected block and to unselected memory blocks in the same plane as the selected block. It should be understood that, in some examples, erase operations may be performed at the half block level, at the quarter block level, or at any suitable number of blocks or any fraction of blocks. Memory cells 306 of adjacent memory strings 308 may be coupled by word lines 318 that select which row of memory cells 306 is affected by read and program operations. In some implementations, each word line 318 is coupled to a memory page 320 of memory cells 306. The size of a memory page 320 in bits may be related to the number of memory strings 308 coupled by word lines 318 in one block 304. Each word line 318 may include a plurality of control gates (gate electrodes) at each memory cell 306 in a corresponding memory page 320 and a gate line coupling the control gates. In combination with FIG. 3A above, a memory page 320 includes a plurality of memory cells 306, the plurality of memory cells are isolated by the top selection gate isolation structure and the gate line slit structure, and multiple memory cells between the top selection gate isolation structure and the gate line slit structure are arranged into multiple memory cell rows, and each memory cell row is parallel to the gate line slit structure and the top selection gate isolation structure. Memory cells in a slice where they share the same word line form a programmable (read/write) page.

Figure 4:
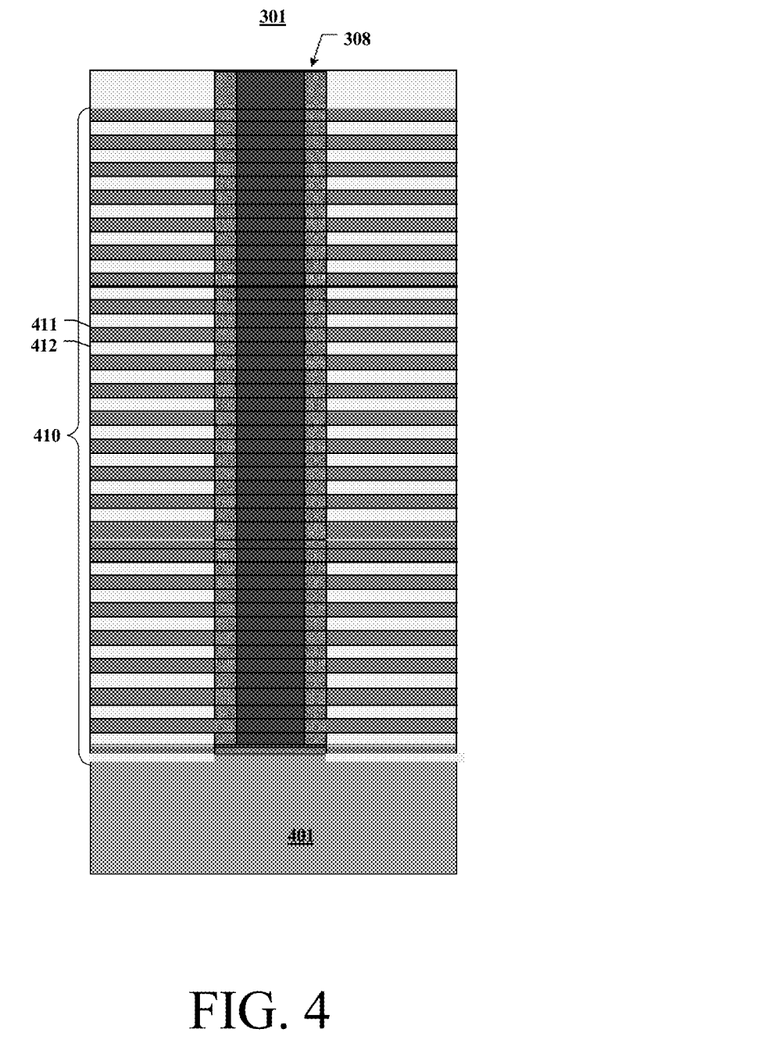
FIG. 4 is a schematic cross-sectional view of a memory array including memory strings according to an example of the present disclosure.

FIG. 4 shows a schematic cross-sectional view of an example memory array 301 including memory strings 308 in accordance with aspects of the present disclosure. As shown in FIG. 4, the memory string 308 may include a stacked structure 410, which includes a plurality of gate layers 411 and a plurality of insulating layers 412 alternately stacked in sequence, and memory string 308 vertically penetrating through the gate layers 411 and the insulating layers 412. The gate layer 411 and the insulating layer 412 can be stacked alternately, and two adjacent gate layers 411 are separated by an insulating layer 412. The number of memory cells included in the memory array 301 is mainly related to the number of pairs of gate layers 411 and insulating layers 412 in the stacked structure 410.

Constituent materials of the gate layer 411 may include a conductive material. Conductive materials may include, but are not limited to, tungsten (W), cobalt (Co), copper (Cu), aluminum (Al), polysilicon, doped silicon, silicide, or any combination thereof. In some implementations, each gate layer 411 includes a metal layer, e.g., a tungsten layer. In some implementations, each gate layer 411 includes a doped polysilicon layer. Each gate layer 411 may include a control gate surrounding the memory cell. The gate layer 411 at the top of the stacked structure 410 may extend laterally as a top select gate line, the gate layer 411 at the bottom of the stacked structure 410 may extend laterally as a bottom select gate line, and the gate layer 411 extending laterally between the top select gate line and the bottom selection gate line may serve as a word line layer.

In some examples, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable materials.

In some examples, memory string 308 includes a channel structure extending vertically through stacked structure 410. In some implementations, the channel structure includes a channel hole filled with semiconductor material(s) (e.g., as a semiconductor channel) and dielectric material(s) (e.g., as a memory film). In some implementations, the semiconductor channel includes silicon, e.g., polysilicon. In some implementations, the memory film is a composite dielectric layer including a tunneling layer, a storage layer (also referred to as a "charge trap/storage layer"), and a barrier layer. The channel structure may have a cylindrical shape (e.g., a pillar shape). According to some implementations, the semiconductor channel, the tunneling layer, the storage layer and the barrier layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The barrier layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

Figure 5:
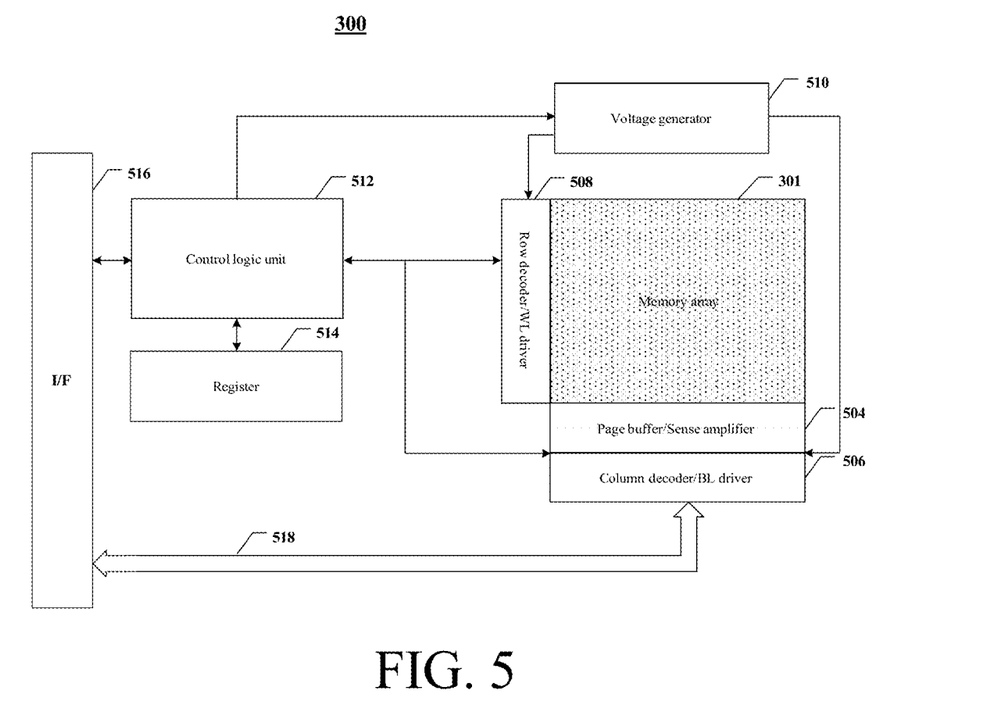
FIG. 5 is a schematic diagram of an example memory including a memory array and peripheral circuits according to an example of the present disclosure.

Referring back to FIG. 3B, a peripheral circuit 302 may be coupled to memory array 301 through bit lines 316, word lines 318, source lines 314, BSL lines 315, and TSL lines 313. The peripheral circuit 302 may include any suitable analog, digital, and mixed-signal circuitry for facilitating operations of the memory array 301 by applying voltage and/or current signals to each target memory cell 306 and sensing voltage signals and/or current signals from each target memory cell 306 via bit lines 316, word lines 318, source lines 314, BSL lines 315, and TSL lines 313, so as to. The peripheral circuit 302 may include various types of peripheral circuits formed using metal-oxide-semiconductor technology. For example, some example peripheral circuits are shown in FIG. 5. The peripheral circuit 302 includes page buffer/sense amplifier 504, column decoder/bit line driver 506, row decoder/word line driver 508, voltage generator 510, control logic unit 512, registers 514, interface 516 and data bus 518. It should be understood that in some examples, additional peripheral circuit not shown in FIG. 5 may further be included.

Page buffer/sense amplifier 504 may be configured to read data from and program (write) data to memory array 301 according to control signals from control logic unit 512. In one example, page buffer/sense amplifier 504 may store a page of program data (write data) to be programmed into one page 320 of memory array 301. In another example, page buffer/sense amplifier 504 may perform a program verify operation to ensure that data has been correctly programmed into memory cell 306 coupled to selected word line 318. In yet another example, page buffer/sense amplifier 504 may further sense a low power signal from bit line 316 representing a data bit stored in memory cell 306 and amplify the small voltage swing to a recognizable logic level during a read operation. Column decoder/bit line driver 506 may be configured to be controlled by control logic unit 512 and to select one or more memory strings 308 by applying bit line voltages generated from voltage generator 510.

Row decoder/word line driver 508 may be configured to be controlled by control logic unit 512 and select/deselect blocks 304 of memory array 301 and select/deselect word lines 318 of blocks 304. Row decoder/wordline driver 508 may further be configured to drive wordline 318 using a wordline voltage generated from voltage generator 510. In some implementations, the row decoder/wordline driver 508 can further select/deselect and drive the BSL line 315 and the TSL line 313. As described in detail below, the row decoder/word line driver 508 is configured to perform program operations on the memory cells 306 coupled to the selected word line(s) 318. The voltage generator 510 may be configured to be controlled by the control logic unit 512 and generate word line voltages (e.g., read voltages, program voltages, pass voltages, local voltages, verify voltages, etc.), bit line voltages and source line voltage to be supplied to the memory array 301.

Control logic unit 512 may be coupled to each of the peripheral circuits described above and configured to control the operation of each of the peripheral circuits. Registers 514 may be coupled to the control logic unit 512 and include status registers, command registers and address registers for storing status information, command operation codes (OP codes) and command addresses for controlling the operation of each peripheral circuit. Interface 516 may be coupled to control logic unit 512 and act as a control buffer to buffer control commands received from a host device (not shown) and relay it to control logic unit 512, and to buffer status information received from control logic unit 512 and relay it to the host device. Interface 516 may further be coupled to column decoder/bit line driver 506 via data bus 518 and act as a data I/O interface and data buffer to buffer and relay data to or from memory array 301.

Figure 6:
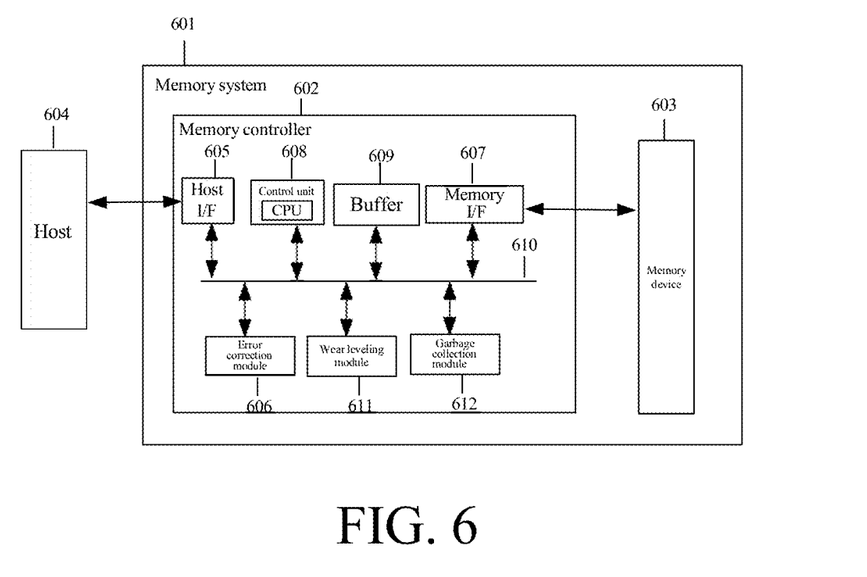
FIG. 6 is a schematic structural diagram of a framework of a memory system according to an example of the present disclosure.

FIG. 6 shows a block diagram of a memory system 601. The memory system 601 includes: a memory controller 602 and a memory device 603. The memory controller 602 is used to control the memory device 603 to perform read and write operations. Here, the memory controller 602 may be coupled to the memory device 603 in any suitable manner. The memory controller 602 includes a control unit (CPU) 608, a buffer 609, an error correction module 606, a host I/F 605, a memory I/F 607, a wear leveling module 611, and a garbage collection module 612. In the examples of the present disclosure, the memory device 603 may be a non-volatile semiconductor memory for storing data, for example, a NAND memory. The memory system 601 is connected to a host 604. The host I/F 605 outputs commands received from the host 604, valid data (write data) and the like to the internal bus 610, and transmits valid data (read data) read from the memory device 603, responses from the control unit 608 and the like to the host 604.

The memory I/F 607 controls the process of writing data and the like to the memory device 603 and the process of reading from the memory device 603 based on instructions from the control unit 608. The control unit 608 controls the memory system 601 as a whole. The control unit 608 is, for example, a central processing unit (CPU), a microprocessor (MPU), or the like. When receiving a command from the host 604 via the host I/F 605, the control unit 608 performs control according to the command. For example, the control unit 608 instructs the memory I/F 607 to write data into the memory device 603 according to a command from the host 604. In addition, the control unit 608 instructs the memory I/F 607 to read data from the memory device 603 according to a command from the host 604.

The buffer 609 temporarily stores data received from the host 604 before storing it to the memory device 603, and temporarily stores data read from the memory device 603 before sending it to the host 604.

The error correction module 606 is a data encoding and decoding unit. Due to the inherent bit error rate in flash memory, an Error Checking and Correcting (ECC) check protection should be added to the original data during the data writing operation for the correctness of the data, which is an encoding process. When reading data, it is also necessary to detect and correct errors through decoding. If the number of erroneous bits exceeds the ECC error correction capability, the data will be uploaded to the host in the form of "uncorrectable error". The process of ECC encoding and decoding herein is completed by the error correction module 606.

Since the flash memory is erased before writing and cannot be overwritten, the user can only find other space to write the new data when updating the data. As a result, the data in the original space expires to become garbage, which needs garbage collection to free up for new writing space. The garbage collection module 612 can be used to move out the valid data on several flash memory blocks, write them to a new flash memory block, and then erase these previous flash memory blocks to obtain usable flash memory blocks.

Flash memory has a lifespan, that is, the block of flash memory has a limit on the number of erasing and writing. If the erasing and writing times of a block exceed a certain value, the block will become less reliable, or even become a bad block and cannot be used. The wear leveling module 611 can prevent some blocks from being frequently erased and written, so that the erase and write time of each block can be kept relatively balanced, thereby prolonging the service life of the whole memory.

Operations of the memory system (e.g., data writing operations, data reading operations, data erasing operations, etc.) can be implemented by running Firmware stored in the memory system.

The memory device in the examples of the present disclosure includes but is not limited to a three-dimensional NAND memory, and for ease of understanding, a three-dimensional NAND memory is used as an example for illustration.

Firmware bug will inevitably occur during the running of firmware. Generally, the bug can be localized through the event log information generated during the running of the firmware. The event log information is generally stored in the memory device in the memory system. The event log information stored in the memory device will be read out when bug localization is needed. The storage space used to store event log information in the memory device is generally limited. At present, the commonly used method is to directly store the American Standard Code for Information Interchange (ASCII) corresponding to the event log information generated during the running of the firmware. Alternatively, a suitable compression algorithm is used to compress and store the event log information. However, these two methods still need to occupy a relatively large storage space in the memory device when storing the event log information. With the continuous improvement of the requirements for the three-dimensional NAND memory, storing more valid event log information in a limited storage space and saving the capacity of the memory device have become an urgent problem to be solved.

Figure 7:
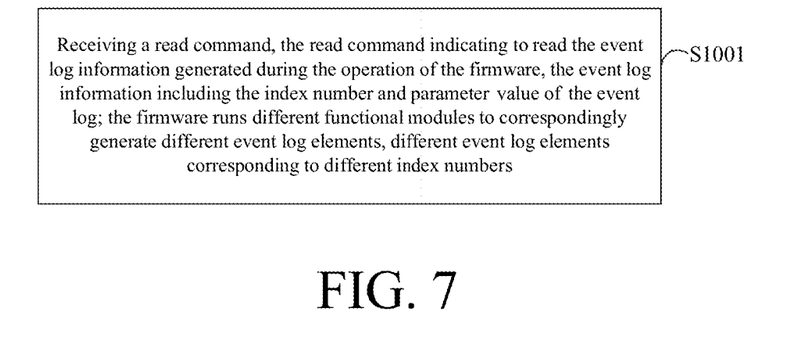
FIG. 7 is a schematic flowchart of an implementation of an operation method of a memory system according to an example of the present disclosure.

In view of one or more of the above problems, an example of the present disclosure provides an operation method of a memory system, and as shown in FIG. 7, the method includes:

Step S1001: receiving a read command, the read command indicating to read the event log information generated during the running of the firmware, the event log information including the index number and parameter value of the event log; the firmware run different functional modules to correspondingly generate different event log elements, the different event log elements corresponding to different index numbers.

Herein, the firmware refers to the program written into the erasable programmable read-only memory or electrically erasable programmable read-only memory, namely, a device "driver" stored internally in the memory system. An operation system is enabled to implement specific running actions according to the standard device drive only by means of the firmware. The firmware is the software responsible for the most underlying and most bottom-level tasks of a system.

In some examples, the firmware is stored in a read-only memory in a memory controller or in a memory device of the memory system.

Bugs will inevitably appear during the running of the firmware, and various different event log information will be generated during the running of the firmware. Some critical information generated during the running of the firmware is recorded in the event log information, so that the event log information generated during the running of the firmware can subsequently be used to efficiently locate bugs and provide data support for subsequent system recovery. The types of event log information generated by the firmware when the current program runs different functional modules are also different.

In some examples, the functional modules include, but are not limited to, a Garbage Collection (GC) module, a normal power on and off module, an abnormal power on and off module, a Wear Leveling (WL) module, and a bad block management module.

In some examples, when the firmware runs different functional modules, different event log elements will be generated correspondingly, and different parameters need to be recorded for different event log elements. By way of example, when the firmware runs the garbage collection module, the identification number of the current source block, the type of the current source block, the identification number of the target block, the type of the target block and the like will be recorded in the corresponding event log element.

Different event log elements herein correspond to different index numbers. That is to say, each index number corresponds to a unique event log element, and each event log element only corresponds to a unique index number, and different parameters need to be recorded for different event log elements. It shall be understood that in the examples of the present disclosure, different event log elements are numbered, and different event log elements correspond to different index numbers. When recording event log information in the memory system, only index numbers and parameter values are recorded, so that the storage space occupied by each piece of event log information is greatly reduced. Therefore, the space for storing event log information in the memory device can be saved, so that more valid event log information can be stored in a limited storage space.

The following will introduce how to realize that the event log information stored in the memory system includes index numbers and parameter values.

In some examples, the firmware includes an event log information output program, and the event log information output program is set to record the index number and parameter value of the event log.

In some examples, the method further includes:

When the firmware runs the function module, the event log information output program in the firmware is run to generate event log information including index numbers and parameter values.

It shall be understood that the recording of event log information is realized by running the program in the firmware. In the example of the present disclosure, the event log information output program in the firmware is set accordingly, so that when the firmware runs the function module, event log information including index number and parameter value can be output according to settings.

In the example of the present disclosure, the event log information stored in the memory system includes only the index number and parameter value, but the content of the event log information cannot be obtained only through the index number and parameter value. The following will introduce how to obtain complete content of the event log information in an example.

In some examples, the event log element corresponding to the index number and the parameter name corresponding to the parameter value in the event log information can be obtained according to the event log information and the code file. The code file includes a correspondence table between the event log element and the index number, and a list of parameter names corresponding to each event log element. Here, the code file includes, but is not limited to, a dat file. The correspondence relationship between the index number and the event log element and a list of parameter names corresponding to each event log element are stored in the code file. By virtue of the index number of the event log information in the memory system in combination with the code file, the event log element corresponding to the index number in the memory system can be obtained. Then the list of parameters corresponding to a certain index number in the memory system can be obtained through the list of parameter names corresponding to each event log element in the code file, so as to obtain the parameter name corresponding to each parameter value in a piece of event log information recorded in the memory system, and thus obtain the complete content of the event log information in the memory system.

It is understood that in the examples of the present disclosure, the event log information in the memory system includes only index numbers and parameter values, and the event log information in the memory system needs to be combined with the content in the code file to obtain the complete content of the event log information after parsing, so that the event log information can be encrypted, thereby improving the security of the information.

In some examples, the method further includes:
before receiving the read command, temporarily storing the event log information in the buffer.

In some examples, the method further includes:
dumping the event log information temporarily stored in the buffer into the memory device.

Here, the buffer may be a buffer in the memory controller. The event log information generated during running of firmware will be temporarily stored in the buffer in the memory controller. When the data size of the event log information stored in the buffer is greater than a preset value, the event log information in the buffer will be dumped into a memory device. The preset value herein can be set according to the size of the storage space of the buffer.

Here, the read command is received, and the read command indicates to read the event log information generated during the running of the firmware. It shall be understood that the event log information in the memory device is generally read herein, but after receiving the read command, the data size of the event log information in the buffer may not reach the preset value, that is to say, there may be some event log information stored in the buffer. Consequently, the read command here can also read the event log information in the buffer in the memory controller.

It shall be understood that in the examples of the present disclosure, the size of the storage space occupied by each piece of event log information becomes smaller, and the event log information temporarily stored in the buffer of the memory controller is dumped into the memory device only when the data size is greater than the preset value, so that more pieces of event log information can be stored in the buffer before being dumped into the memory device. In the case of recording the same number of pieces of event log information, the examples of the present disclosure provide a solution that can greatly reduce the number of times of writing event log information into the memory device, thereby saving the read and write resources of the CPU and the memory device.

In some examples, the list of parameter name includes multiple parameter names. The code file further includes: placeholder information corresponding to the parameter names.

The interval between two adjacent parameter values can be obtained according to the placeholder information.

It shall be understood that, in the event log information stored in the memory system, no other symbols may be set between two adjacent parameter values for division, and the code file in the example of the present disclosure may further include placeholder information corresponding to the parameter name. Dividing two adjacent parameter values is achieved through the placeholder information corresponding to each parameter name, so that the storage space occupied by each event log information in the memory system can be further reduced.

The forms of the code file, the event log information in the memory system, and the parsed event log information will be described below as examples.

As an example, one piece information in the code file is: (00cf0212 "(% d) cpu % d adm cq, sq len: % x, cp len: % x"), in which 00cf0212 is the index number, "(% d) cpu % d adm cq, sq len: % x, cp len: % x" is an event log element; cpu, sq len, and cp len are parameter names respectively, which together form a list of parameters, where the first % d before which parameter name is not set may be the system time corresponding to the first parameter value the system defaults to; the first % d can correspond to the system time placeholder, the second % d can correspond to the CPU ID placeholder, the first % x corresponds to the placeholder of the first parameter sq len, and the second % x corresponds to the placeholder of the second parameter cp len.

One piece of the event log information stored in the memory system is: 00cf0212005912f300000c000c000c000c, in which 00cf0212 is the index number, and there are four parameter values after the index number, which are 005912f3, 00, 000e000e, and 000c000c, respectively corresponding to the system time stamp, CPU ID, and the first parameter, and the second parameter. The placeholder of each parameter value may be used to distinguish the intervals between two adjacent parameter values.

By combining the code file with the event log information in the memory system, the complete contents of the event log information obtained after parsing are: CPU0 adm cp, sq len: c00c, cp len: c00c.

An example of the present disclosure provides an operation method of a memory system. The method includes: receiving a read command, the read command indicating to read event log information generated during running of the firmware, and the event log information including the index number and parameter value of the event log; the firmware runs different function modules to generate different event log elements, and different event log elements correspond to different index numbers. In the examples of the present disclosure, the event log information read from the memory system includes only the index number and parameter value of the event log, so that the data volume of each piece event log information is greatly reduced, thereby the storage resources for storing event log information can be reduced, so that more valid event log information can be stored in the effective storage space.

Figure 8:
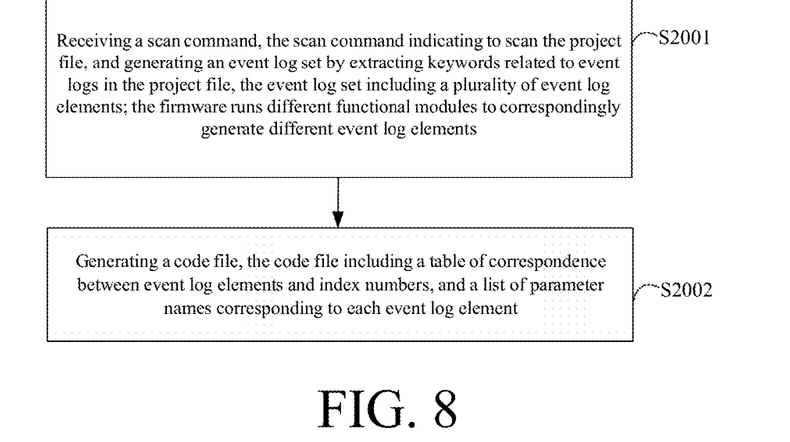
FIG. 8 is a schematic flowchart of an implementation of an operation method of a host device according to an example of the present disclosure.

An example of the present disclosure provides an operation method of a host device, and as shown in FIG. 8, the method includes:

Step S2001: receiving a scan command, the scan command indicating to scan the project file, and generating a set of event logs by extracting keywords related to event logs in the project file, the set of event logs including a plurality of event log elements; and the firmware runs different functional modules to correspondingly generate different event log elements; and Step S2002: generating a code file, the code file including a table of correspondence between event log elements and index numbers and a list of parameter names corresponding to each event log element.

In some examples, the host device includes a compiling system. The compiling system includes a compiling controller, and the execution subject in the above examples may be a compiling controller. That is, the compiling controller receives a scan command, generates a set of event logs, and generates the code file.

It shall be understood that the project file contains a lot of information, and by extracting keywords related to event log information, a set of event logs including multiple event log elements can be obtained efficiently.

In some examples, the method further includes:
  receiving event log information and the code file, the event log information including the index number and a parameter value of the event log; the firmware runs different function modules to correspondingly generate different event log elements, the different event log elements corresponding to different index numbers; and
  obtaining the event log element corresponding to the index number in the event log information and the parameter name corresponding to the parameter value in the event log information, according to the event log information and the code file.

In some examples, the host device further includes a parsing system, and the parsing system includes a parsing controller, and the execution subject in the above examples may be a parsing controller. That is, the parsing controller receives event log information and code file, and obtains the event log element corresponding to the index number in the event log information, and the parameter name corresponding to the parameter value in the event log information.

In some examples, the list of parameter names includes a plurality of parameter names; the code file further includes: placeholder information corresponding to the parameter names; and the method further includes:
  obtaining an interval between two adjacent parameter values according to the placeholder An example of the present disclosure provides an operation method of a host device, the method including: receiving a scan command, the scan command indicating to scan a project file, and generate a set of event logs by extracting keywords related to the event log in the project file, the set of event logs including a plurality of event log elements; firmware runs different functional modules to correspondingly generate different event log elements; and generating a code file, the code file including a table of correspondence between the event log elements and index numbers, and a list of parameter names corresponding to each of the event log elements. In the examples of the present disclosure, the set of event logs is generated by scanning the project file, and then the code file is generated. Since the code file includes a table of correspondence between event log elements and index numbers, and a list of parameter names corresponding to each event log element, it can be combined with the event log information in the memory system, and the complete content of the event log information may be obtained through parsing, while the memory occupied by the code file itself is small. Thus, the memory occupied by the event log information can be saved while complete event log information can be obtained. In addition, the event log information in the memory system needs to be combined with the code file in the host device to obtain the complete content of the event log information, so that the event log information can be encrypted, thereby improving the security of the information.

Figure 9:
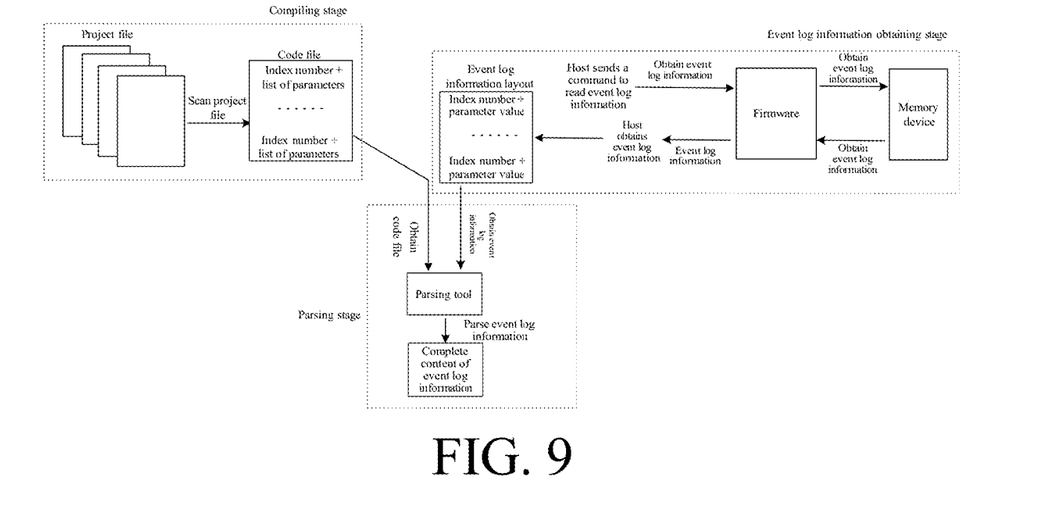
FIG. 9 is a schematic flowchart of a framework for obtaining complete content of event log information according to an example of the present disclosure.

FIG. 9 is a schematic flowchart of a framework for obtaining complete contents of event log information according to an example of the present disclosure. As shown in FIG. 9, the process of obtaining the complete content of event log information provided by the example of the present disclosure includes three stages: compiling stage, event log information obtaining stage, and parsing stage. In the compiling phase, the compiling controller of the compiling system will first receive the scan command and scan the project file to generate a code file in dat format, which includes an index number and a list of parameters. In the event log information obtaining stage, the host sends a command to read event log information to the memory system, and the memory controller in the memory system receives the command to read event log information, and transmits the command to the memory device via the firmware. The firmware obtains the event log information from the memory device. The host obtains the event log information through the firmware, and the event log information obtained by the host includes index numbers and parameter values. In the parsing stage, the parsing controller of the parsing system obtains the code file and the event log information read from the memory device, and parses the code file and the event log information read from the memory device in the parsing tool, thereby obtaining the complete content of the event log information in the parsing tool.

Based on the above operation method of the memory system, an example of the present disclosure further provides a memory system, where the memory system includes a memory device and a memory controller coupled to the memory device;
  the memory controller is configured to:
  receive a read command, the read command indicating to read event log information generated during running of firmware, the event log information including an index number and a parameter value of an event log; and the firmware runs different functional modules to correspondingly generate different event log elements, the different event log elements corresponding to different index numbers.

In some examples, the firmware includes an event log information output program, and the event log information output program is set to record the index number and the parameter value of the event log; and the memory controller is configured to:
  when the firmware runs the function module, run the event log information output program in the firmware to generate the event log information including the index number and the parameter value.

In some examples, the event log element corresponding to the index number in the event log information and a parameter name corresponding to the parameter value in the event log information are obtainable according to the event log information and the code file; the code file includes a table of correspondence between the event log elements and the index numbers, and a list of parameter names corresponding to each of the event log elements.

In some examples, the list of parameter names includes a plurality of parameter names; the code file further includes: placeholder information corresponding to the parameter names; and an interval between two adjacent parameter values is obtainable according to the placeholder information.

In some examples, the memory controller is configured to:

temporarily store the event log information in a buffer before receiving the read command.

In some examples, the memory controller is configured to:

dump the event log information temporarily stored in the buffer into the memory device.

In some examples, the functional modules include: a garbage collection module, a normal power on and off module, an abnormal power on and off module, a wear leveling module, and a bad block management module.

In some examples, the memory system includes a memory card or a solid state drive.

Here, reference may be made to the aforementioned detailed introductions to FIG. 1, FIG. 2A, FIG. 2B, FIG. 3A, FIG. 3B, FIG. 4, FIG. 5, and FIG. 6 for the structure and composition of the memory system. Other details on the memory system are similar to those described for the operation method of the memory system, which are not repeated herein for the sake of brevity.

Based on the above operation method of the host device, an example of the present disclosure further provides a host device, the host device includes a compiling system; the compiling system includes a compiling controller, and the compiling controller is configured to:

receive a scan command, the scan command indicating to scan a project file, and generate a set of event logs by extracting keywords related to the event log in the project file, the set of event logs including a plurality of event log elements; firmware runs different functional modules to correspondingly generate different event log elements; and generate a code file, the code file including a table of correspondence between the event log elements and index numbers, and a list of parameter names corresponding to each of the event log elements.

In some examples, the host device further includes a parsing system, the parsing system includes a parsing controller, and the parsing controller is configured to:

receive event log information and the code file, the event log information including the index number and a parameter value of the event log; the firmware runs different function modules to correspondingly generate different event log elements, the different event log elements corresponding to different index numbers; and obtain the event log element corresponding to the index number in the event log information and the parameter name corresponding to the parameter value in the event log information according to the event log information and the code file.

In some examples, the list of parameter names includes a plurality of parameter names; the code file further includes: placeholder information corresponding to the parameter names; and the parsing controller is configured to:

obtain an interval between two adjacent parameter values according to the placeholder Here, reference may be made to the detailed introductions to FIG. 1 above for the structure and composition of the host device, and other details about the host device are similar to those described above for the operation method of the host device, which are not repeated herein for the sake of brevity.

Based on the above-mentioned operation method of the memory system and operation method of the host device, an example of the present disclosure further provides a computer-readable storage medium having stored thereon a computer program which, when executed by a processor, performs the operation method described in any of the above-mentioned examples.

All or part of the processes in the method of the above-mentioned examples herein can be implemented by instructing related hardware through a computer program. The program can be stored in a computer-readable storage medium. When the program is executed, the flow of the examples of the above-mentioned methods may be included. The storage medium may be a magnetic disk, an optical disk, a Read-Only Memory (ROM), a Random Access Memory (RAM), a Flash Memory, a Hard Disk Drive (HDD), or a solid-state drive, etc. The storage medium may further include a combination of the above-mentioned types of memory.

It is understood that reference throughout the specification to "one example" or "an example" means that a particular feature, structure or characteristic related to the example is included in at least one example of the present disclosure. Thus, appearances of "in one example" or "in an example" in various places throughout the specification are not necessarily referring to the same example. Furthermore, the particular features, structures or characteristics may be combined in any suitable manner in one or more examples. It should be understood that in various examples of the present disclosure, the sequence numbers of the above-mentioned processes do not mean the order of execution, and the execution order of the processes should be determined by their functions and inherent logic, rather than limiting implementation of the examples of the present disclosure. The serial numbers of the above-mentioned examples of the present disclosure are for description only, and do not represent the advantages and disadvantages of the examples.

The methods disclosed in the several method examples provided in the present disclosure can be combined arbitrarily to obtain new method examples if there is no conflict.

According to a first aspect of an example of the present disclosure, there is provided a memory system, including a memory device and a memory controller coupled to the memory device; the memory controller is configured to: receive a read command, the read command indicating to read event log information generated during running of firmware, the event log information including an index number and a parameter value of an event log; and the firmware runs different functional modules to correspondingly generate different event log elements, the different event log elements corresponding to different index numbers.

In some implementations, the firmware includes an event log information output program, and the event log information output program is set to record the index number and the parameter value of the event log; the memory controller is configured to: when the firmware runs the function module, run the event log information output program in the firmware to generate the event log information including the index number and the parameter value.

In some implementations, the event log element corresponding to the index number in the event log information and a parameter name corresponding to the parameter value in the event log information are obtainable according to the event log information and the code file; and the code file includes a table of correspondence between the event log elements and the index numbers, and a list of parameter names corresponding to each of the event log elements.

In some implementations, the list of parameter names includes a plurality of parameter names; the code file further includes: placeholder information corresponding to the parameter names; and an interval between two adjacent parameter values is obtainable according to the placeholder information.

In some implementations, the memory controller is configured to: temporarily store the event log information in a buffer before receiving the read command.

In some implementations, the memory controller is configured to: dump the event log information temporarily stored in the buffer into the memory device.

In some implementations, the functional modules include: a garbage collection module, a normal power on and off module, an abnormal power on and off module, a wear leveling module, and a bad block management module.

In some implementations, the memory system includes a memory card or a solid state drive.

According to a second aspect of an example of the present disclosure, there is provided a host device, including compiling system; the compiling system includes a compiling controller, and the compiling controller is configured to: receive a scan command, the scan command indicating to scan a project file, and generate a set of event logs by extracting keywords related to the event log in the project file, the set of event logs including a plurality of event log elements; firmware runs different functional modules to correspondingly generate different event log elements; and generate a code file, the code file including a table of correspondence between the event log elements and index numbers, and a list of parameter names corresponding to each of the event log elements.

In some implementations, the host device further includes a parsing system, the parsing system includes a parsing controller, and the parsing controller is configured to: receive event log information and the code file, the event log information including the index number and a parameter value of the event log; the firmware runs different function modules to correspondingly generate different event log elements, the different event log elements corresponding to different index numbers; and obtain the event log element corresponding to the index number in the event log information and the parameter name corresponding to the parameter value in the event log information according to the event log information and the code file.

In some implementations, the list of parameter names includes a plurality of parameter names; the code file further includes: placeholder information corresponding to the parameter names; the parsing controller is configured to: obtain an interval between two adjacent parameter values according to the placeholder information.

According to a third aspect of an example of the present disclosure, there is provided an operation method of a memory system, the method including: receiving a read command, the read command indicating to read event log information generated during running of firmware, the event log information including an index number and a parameter value of an event log; and the firmware runs different functional modules to correspondingly generate different event log elements, the different event log elements corresponding to different index numbers.

In some implementations, the firmware includes an event log information output program, and the event log information output program is set to record the index number and the parameter value of the event log; the method further includes: when the firmware runs the function module, running the event log information output program in the firmware to generate the event log information including the index number and the parameter value.

In some implementations, the event log element corresponding to the index number in the event log information and a parameter name corresponding to the parameter value in the event log information are obtainable according to the event log information and the code file; and the code file includes a table of correspondence between the event log elements and the index numbers, and a list of parameter names corresponding to each of the event log elements.

In some implementations, the list of parameter names includes a plurality of parameter names; the code file further includes: placeholder information corresponding to the parameter names; and an interval between two adjacent parameter values is obtainable according to the placeholder information.

In some implementations, the method further includes: temporarily storing the event log information in a buffer before receiving the read command.

In some implementations, the method further includes: dumping the event log information temporarily stored in the buffer into the memory device.

According to a fourth aspect of the examples of the present disclosure, there is provided an operation method of a host device, the method including: receiving a scan command, the scan command indicating to scan a project file, and generating a set of event logs by extracting keywords related to the event log in the project file, the set of event logs including a plurality of event log elements; firmware runs different functional modules to correspondingly generate different event log elements; and generating a code file, the code file including a table of correspondence between the event log elements and index numbers, and a list of parameter names corresponding to each of the event log elements.

In some implementations, the method further includes: receiving event log information and the code file, the event log information including the index number and a parameter value of the event log; the firmware runs different function modules to correspondingly generate different event log elements, the different event log elements corresponding to different index numbers; and obtaining the event log element corresponding to the index number in the event log information and the parameter name corresponding to the parameter value in the event log information according to the event log information and the code file.

In some implementations, the list of parameter names includes a plurality of parameter names; the code file further includes: placeholder information corresponding to the parameter names; and the method further includes: obtaining an interval between two adjacent parameter values according to the placeholder information.

According to a fifth aspect of examples of the present disclosure, there is provided a computer-readable storage medium having stored thereon a computer program which, when executed by a processor, performs the operation method according to any of various implementations.

The forgoing description is only implementations of the present disclosure, but the scope of protection of the present disclosure is not limited thereto. Anyone skilled in the art can easily conceive of changes or substitutions within the technical scope of the present disclosure, which should fall within the protection scope of the present disclosure. Therefore, the protection scope of the present disclosure shall be determined by the protection scope of the claims.

What is claimed is:

1. A memory system, comprising:
a memory device; and
a memory controller coupled to the memory device, wherein the memory controller is configured to:
receive a read command, the read command indicating to read event log information generated during running of firmware, the event log information comprising an index number and a parameter value of an event log; wherein the firmware runs different functional modules to correspondingly generate different event log elements, the different event log elements corresponding to different index numbers, wherein the firmware comprises an event log information output program, and the event log information output program is set to record the index number and the parameter value of the event log; and
when the firmware runs a function module, run the event log information output program in the firmware to generate the event log information comprising the index number and the parameter value.

2. The memory system of claim 1, wherein the event log element corresponding to the index number in the event log information and a parameter name corresponding to the parameter value in the event log information are obtainable according to the event log information and a code file; and the code file comprises a table of correspondence between the event log elements and the index numbers, and a list of parameter names corresponding to each of the event log elements.

3. The memory system of claim 2, wherein the list of parameter names comprises a plurality of parameter names; wherein,
the code file further comprises:
placeholder information corresponding to the parameter names; and
an interval between two adjacent parameter values is obtainable according to the placeholder information.

4. The memory system of claim 1, wherein the memory controller is configured to:
temporarily store the event log information into a buffer before receiving the read command.

5. The memory system of claim 4, wherein the memory controller is configured to:
dump the event log information temporarily stored in the buffer into the memory device.

6. The memory system of claim 5, wherein the memory controller is configured to:
dump the event log information temporarily stored in the buffer into the memory device when a data size of the event log information stored in the buffer is greater than a preset value.

7. The memory system of claim 1, wherein the functional modules comprise: a garbage collection module, a normal power on and off module, an abnormal power on and off module, a wear leveling module, and a bad block management module.

8. The memory system of claim 1, wherein the memory system comprises a memory card or a solid state drive.

9. The memory system of claim 1, wherein the memory device comprises a three-dimensional NAND memory.

10. The memory system of claim 1, wherein the memory device is a non-volatile semiconductor memory.

11. The memory system of claim 1, wherein the read command indicates to read event log information from the memory device and from a buffer in the memory controller.

12. A host device, comprising:
a compiling system, the compiling system comprising:
a compiling controller, the compiling controller being configured to:
receive a scan command, the scan command indicating to scan a project file;
generate a set of event logs by extracting keywords related to the event logs in the project file, the set of event logs comprising a plurality of event log elements; firmware runs different functional modules to correspondingly generate different event log elements; and
generate a code file, the code file comprising a table of correspondence between the event log elements and index numbers, and a list of parameter names corresponding to each of the event log elements; and
a parsing system, the parsing system comprises a parsing controller, and the parsing controller is configured to:
receive event log information and the code file, the event log information comprising the index number and a parameter value of the event log; the firmware runs different function modules to correspondingly generate different event log elements, the different event log elements corresponding to different index numbers; and
obtain the event log element corresponding to the index number in the event log information and the parameter name corresponding to the parameter value in the event log information according to the event log information and the code file.

13. The host device of claim 12, wherein the list of parameter names comprises a plurality of parameter names; the code file further comprises: placeholder information corresponding to the parameter names; and the parsing controller is configured to:
obtain an interval between two adjacent parameter values according to the placeholder information.

14. An operation method of a memory system, the method comprising:
receiving a read command, the read command indicating to read event log information generated during running of firmware, the event log information comprising an index number and a parameter value of an event log; and the firmware runs different functional modules to correspondingly generate different event log elements, the different event log elements corresponding to different index numbers; wherein the firmware comprises an event log information output program, and the event log information output program is set to record the index number and the parameter value of the event log;
in response to the read command, reading event log information; and
when the firmware runs a function module, running the event log information output program in the firmware to generate the event log information comprising the index number and the parameter value.

15. The operation method of claim 14, wherein the event log element corresponding to the index number in the event log information and a parameter name corresponding to the parameter value in the event log information are obtainable according to the event log information and a code file; and the code file comprises a table of correspondence between the event log elements and the index numbers, and a list of parameter names corresponding to each of the event log elements.

16. The operation method of claim 15, wherein the list of parameter names comprises a plurality of parameter names; wherein,
the code file further comprises:
placeholder information corresponding to the parameter names; and
an interval between two adjacent parameter values is obtainable according to the placeholder information.

17. The operation method of claim 14, wherein the method further comprises:
temporarily storing the event log information into a buffer before receiving the read command.

18. The operation method of claim 17, wherein the method further comprises:
dumping the event log information temporarily stored in the buffer into a memory device.

19. The operation method of claim 14, wherein the read command indicates to read event log information from a memory device of the memory system and from a buffer in the memory controller.

20. The operation method of claim 18, wherein the method further comprises:
dumping the event log information temporarily stored in the buffer into a memory device of the memory system when a data size of the event log information stored in the buffer is greater than a preset value.

\* \* \* \* \*